B. D. SCOTT.
CONNECTING ROD OF RADIAL CYLINDER ENGINES.
APPLICATION FILED MAR. 27, 1916.
1,367,720.
Patented Feb. 8, 1921.
2 SHEETS—SHEET 1.
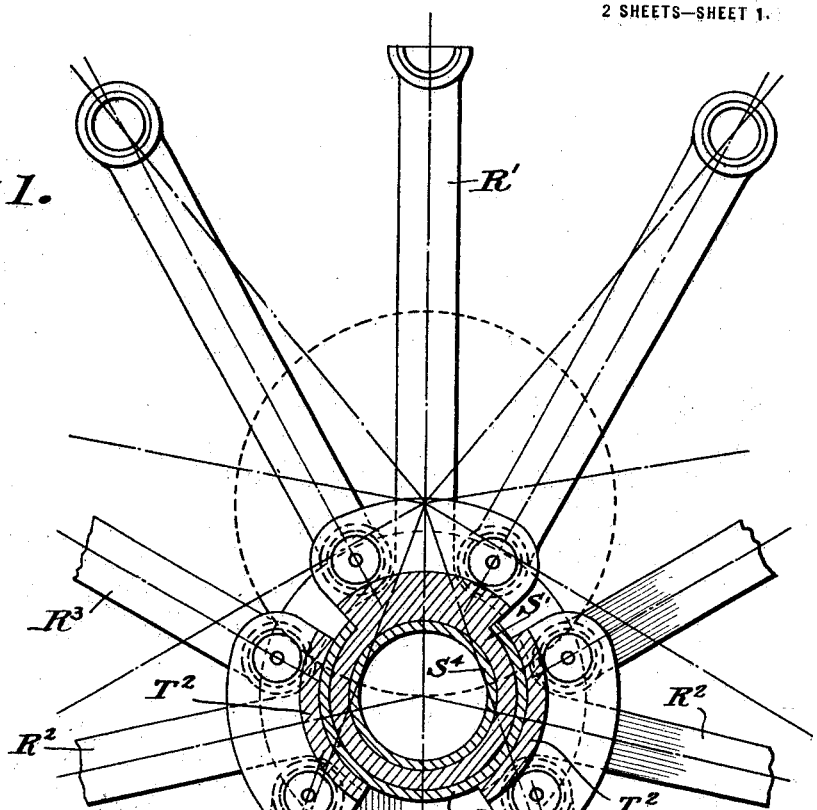
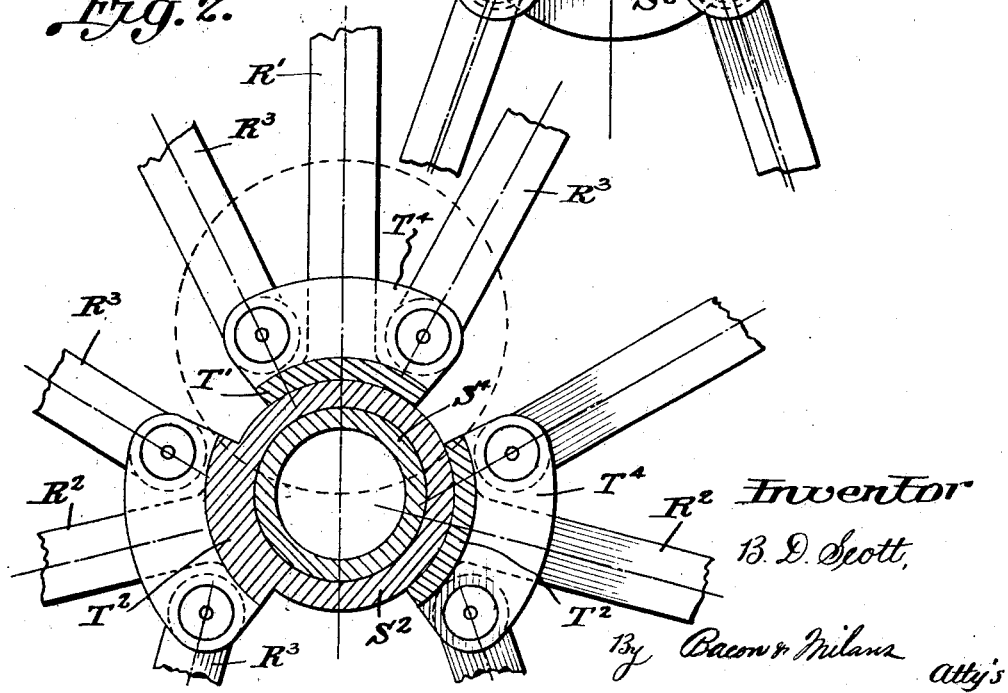

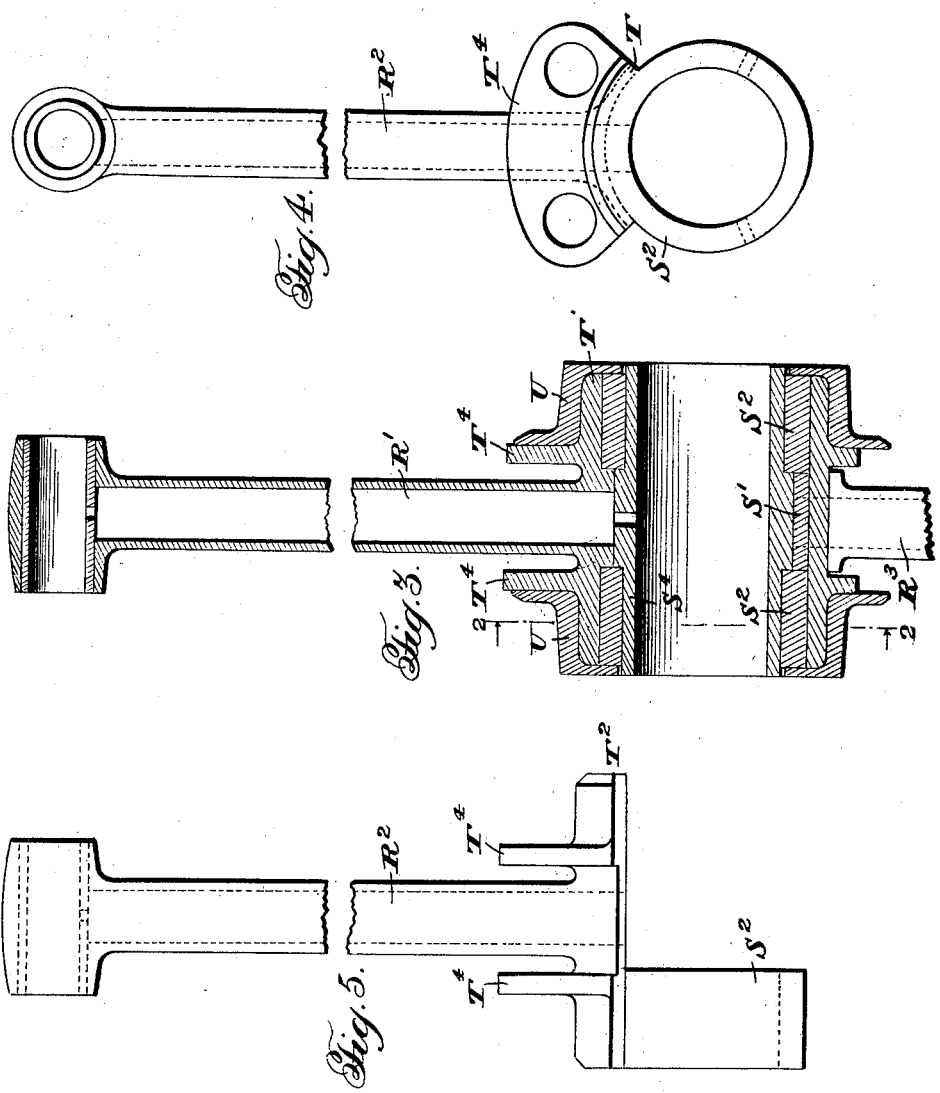

UNITED STATES PATENT OFFICE.

BATEMAN DAVID SCOTT, OF SALE, ENGLAND, ASSIGNOR TO THE GRESHAM FINANCE CORPORATION LIMITED, OF LONDON, ENGLAND, A CORPORATION OF ENGLAND.

CONNECTING-ROD OF RADIAL CYLINDER-ENGINES.

1,367,720.         Specification of Letters Patent.         Patented Feb. 8, 1921.

Application filed March 27, 1916. Serial No. 87,028.

*To all whom it may concern:*

Be it known that I, BATEMAN DAVID SCOTT, a subject of the King of Great Britain, and a resident of Hereford Cottage, Sale, Cheshire, England, have invented new and useful Improvements in and Relating to the Connecting-Rods of Radial Cylinder-Engines, of which the following is the specification.

This invention relates to an improved method of coupling the connecting rods to the crank pin of a radial cylinder engine.

Each connecting rod is provided with a bridge piece and sometimes a ring or rings oscillating upon a bush, the said bridge pieces all being inclosed by means of a capping ring. When a large number of cylinders is employed, the method of coupling the various connecting rods to the crank pin, is by having one master connecting rod, primary connecting rods, and subsidiary connecting rods pivoted to the ends of the said master and primary rods, as described more fully hereinafter.

I append drawings of my invention as applied to a nine-cylinder engine.

Figure 1 is a side elevation, with parts shown in section, showing the nine connecting rods removed from the crank pin, and with the capping ring removed for the sake of clearness.

Fig. 2 is a similar view, the sectional showing being taken on the line 2—2 of Fig. 3.

Fig. 3 is a central longitudinal section of the construction illustrated in Fig. 2. Figs. 4 and 5 are detail views of parts of the construction illustrated in Figs. 2 and 3.

Referring to Fig. 1, a master rod $R^1$ is used ending in a bridge piece $T^1$ having integral with it a steel bush $S^1$, into which is forced the bush $S^4$ for the crank pin bearing. Upon the aforesaid bush $S^1$ is mounted a third bush $S^3$ which has a portion cut away or is open at one side, as illustrated in Fig. 1 of the drawings, to accommodate the bridge piece $T^1$ of said master rod $R^1$. Upon this latter bush bear two primary connecting rods $R^2$ which end in simple bridge pieces $T^2$. Upon each of these three bridge pieces, lugs $T^4$ are formed to carry pins $T^5$ to which the subsidiary connecting rods $R^3$ are pivoted. The bridge pieces are inclosed by capping rings. These capping rings need not be of great tensile strength as one of the rods in each set of three is always in compression. Fig. 1 also shows the big end connections of the master connecting rod and two primary connecting rod ends in section.

An alternative method of coupling up the connecting rod ends to the crank pin is shown in Figs. 2, 3, 4, and 5, of which Fig. 2 is an end view showing the nine connecting rods assembled. Fig. 3 is a cross-section through the axis of the crank pin. Figs. 4 and 5 are end and side views respectively of one of the two primary connecting rods $R^2$. The master connecting rod $R^1$ has its end shaped as in the arrangement already described, with the bush $S^1$ central. The primary connecting rods $R^2$ each end in a bridge piece $T^2$ having integral with it a steel bush $S^2$. The two bushes $S^2$ are arranged one at each side of the bush $S^1$ of the master connecting rod and bear against the bush $S^4$ for the crank pin bearing. The bushes are inclosed by capping rings U. The master rod and the two primary rods have each two subsidiary rods pivoted to them as above described.

What I do claim as my invention and desire to secure by Letters Patent is:—

1. A coupling for connecting the rod ends to a crank pin of a radial engine comprising a master connecting rod having a bridge piece and a relatively narrow bush integral therewith, a bush insertible within the said narrow bush, and an outer bush having a cutaway portion adapted to fit around the narrow bush, primary connecting rods having bridge pieces formed integral therewith and adapted to bear upon the outer bush, and auxiliary connecting rods pivoted to the bridge pieces.

2. A coupling for connecting the rod ends to a crank pin of a radial engine comprising a master connecting rod having an integrally formed bridge piece and a relatively narrow bush integral therewith and extending substantially the entire length of the crank pin, a bush insertible within said narrow bush, and an outer bush adapted to fit around the narrow bush, said outer bush having a cutaway portion adapted to engage the bridge piece, primary connecting rods having integrally formed bridge pieces adapted to bear upon the outer bush, the bridge pieces of the master and primary connecting rods being provided with flanges, auxiliary connecting rods pivoted to said flanges, and caps for inclosing the bridge pieces.

BATEMAN DAVID SCOTT.

Witnesses:
　ERNALD SIMPSON MOSELEY,
　MALCOLM SMETHURST.